(12) United States Patent
Sambandam et al.

(10) Patent No.: US 9,935,995 B2
(45) Date of Patent: Apr. 3, 2018

(54) EMBEDDED SCRIPT SECURITY USING SCRIPT SIGNATURE VALIDATION

(71) Applicant: McAfee, Inc., Santa Clara, CA (US)

(72) Inventors: Venkata Ramanan Sambandam, Sunnyvale, CA (US); Simon Hunt, Naples, FL (US)

(73) Assignee: McAfee, LLC, Santa Clara, CA (US)

( * ) Notice: Subject to any disclaimer, the term of this patent is extended or adjusted under 35 U.S.C. 154(b) by 15 days.

(21) Appl. No.: 14/581,469

(22) Filed: Dec. 23, 2014

(65) Prior Publication Data
US 2016/0182563 A1   Jun. 23, 2016

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| H04L 29/08 | (2006.01) |
| H04L 29/06 | (2006.01) |

(52) U.S. Cl.
CPC ............ H04L 67/02 (2013.01); H04L 63/123 (2013.01)

(58) Field of Classification Search
CPC ............................ H04L 63/12; H04L 63/1466
USPC ......................................................... 726/22
See application file for complete search history.

(56) References Cited

U.S. PATENT DOCUMENTS

| | | | | |
|---|---|---|---|---|
| 7,565,544 B1* | 7/2009 | Eatough | ................ | G06F 21/51 713/161 |
| 9,117,062 B1* | 8/2015 | Fitch | ...................... | G06F 21/30 |
| 9,166,970 B1* | 10/2015 | Dundas | ............... | H04L 63/0823 |
| 2005/0283833 A1* | 12/2005 | Lalonde | ............... | G06F 21/566 726/22 |
| 2011/0219447 A1* | 9/2011 | Horovitz | ............ | G06F 9/45533 726/22 |
| 2013/0139217 A1* | 5/2013 | Xie | ...................... | H04L 63/123 726/1 |
| 2014/0195818 A1* | 7/2014 | Neumann | ........... | G06F 21/6209 713/189 |
| 2014/0286354 A1* | 9/2014 | Van De Poel | .......... | G06F 9/542 370/463 |
| 2015/0082424 A1* | 3/2015 | Shukla | ................ | H04L 63/1466 726/22 |
| 2015/0363598 A1* | 12/2015 | Xu | ........................ | G06F 21/563 726/23 |

OTHER PUBLICATIONS

Tim Dean; Information Exchange between Resilient and High-Threat Networks: Techniques for Threat Mitigation; QinetiQ; year: 2004; pp. 1-33.*

* cited by examiner

*Primary Examiner* — Monjour Rahim
(74) *Attorney, Agent, or Firm* — Blank Rome, LLP

(57) ABSTRACT

A technique allows a client computer with a web browser to receive a web page having active content in response to transmitting a request for content. The active content includes a signature and a set of attributes associated with a web domain. The web browser can interpret the signature and the set of attributes as formatted in the active content. Validation of the signature and the set of attributes can be in a secure mode through a secure enclave module.

14 Claims, 7 Drawing Sheets

```
<SCRIPT TYPE="TEXT/JAVASCRIPT" SECURE="TRUE">
    //SIGNATURE=<THE DIGITAL SIGNATURE OF THIS SCRIPT>
    //ORIGIN=<THE DOMAIN WHICH ISSUED THIS SCRIPT, FOR EXAMPLE WWW.GOOGLE.COM>
    //ALLOWEDDOMAINS=<A DESCRIPTION OF THE DOMAINS THIS SCRIPT IS VALID FOR, FOR EXAMPLE * FOR ANYWHERE,
        OR *.GOOGLE.COM FOR ONLY GOOGLE.COM DOMAINS>
    //CERTIFICATE=<DETAILS ON WHERE TO OBTAIN THE PUBIC CERT USED TO PROTECT THIS SCRIPT>
    ...
<SCRIPT>
```

```
<SCRIPT TYPE="TEXT/JAVASCRIPT" SECURE="TRUE">
    //SIGNATURE=<THE DIGITAL SIGNATURE OF THIS SCRIPT>
    //ORIGIN=<THE DOMAIN WHICH ISSUED THIS SCRIPT, FOR EXAMPLE WWW.GOOGLE.COM>
    //ALLOWEDDOMAINS=<A DESCRIPTION OF THE DOMAINS THIS SCRIPT IS VALID FOR, FOR EXAMPLE * FOR ANYWHERE,
        OR *.GOOGLE.COM FOR ONLY GOOGLE.COM DOMAINS>
    //CERTIFICATE=<DETAILS ON WHERE TO OBTAIN THE PUBIC CERT USED TO PROTECT THIS SCRIPT>
    ...
<SCRIPT>
```

FIG. 1

EMBEDDED SCRIPT SECURITY USING SCRIPT SIGNATURE VALIDATION

TECHNICAL FIELD

Embodiments described herein generally relate to client and server network traffic, and more particularly to dynamically signing active content at a web server or a gateway and validation of the active content at a client web browser.

BACKGROUND ART

Today, when a user or client machine, e.g., a computer or a mobile device, requests a webpage on the Internet via a web browser, e.g., a resource name through a Hypertext Transfer Protocol (HTTP) GET command to a web server, content is sent from the web server or other location on the Internet and is rendered the web browser. Content can include both active content and passive content. Active content, including forms or other dynamic scripts (e.g. embedded script in JavaScript or AJAX), may be embedded in web pages that are received over the Internet. JavaScript instructions that are embedded in web pages can be executed by a web browser when the web page is selected. As more and more users are interconnected over the Internet, computer security becomes increasingly more important as active content in web pages can include malicious software (malware). In some cases, a user may forego security measures from certain websites and implicitly trust that the content being delivered will not harm the user's machine. However, third-parties can circumvent web server security and insert bad content or manipulate active content in web pages during transit from trusted web domains to the user. For example, active content that has the potential to steal information from the user machine can be inserted through cross-site scripting via a gateway or man-in-the middle (MITM) injection.

Prior art solutions on computer security have focused on requiring users to have "special" browsers to view web pages or requiring web site providers to implement excessive and expensive technology to counteract the malware. In other instances, a Hypertext Transfer Protocol Secure (HTTPS) protocol is used to protect the data connection between a web browser and a client by using session keys to encrypt the data flow between the two. However, HTTPS does not protect the user from scripts that are embedded within a web page. Additionally, conventional solutions cannot selectively disable "untrusted" active content within a web page. Other conventional solutions use content security policy (CSP) within a web browser to inform a browser to ignore inline JavaScript or prevent loading image files, audio files, or the like. However, these solutions do not add a trust factor to active content embedded within a web page. A way of ensuring trustworthy active content in web pages that are received by a user client over the internet through a signature method would be desirable.

BRIEF DESCRIPTION OF DRAWINGS

FIG. 1 is an example of an embedded script in a web page according to one embodiment.

DESCRIPTION OF EMBODIMENTS

Figure 2:
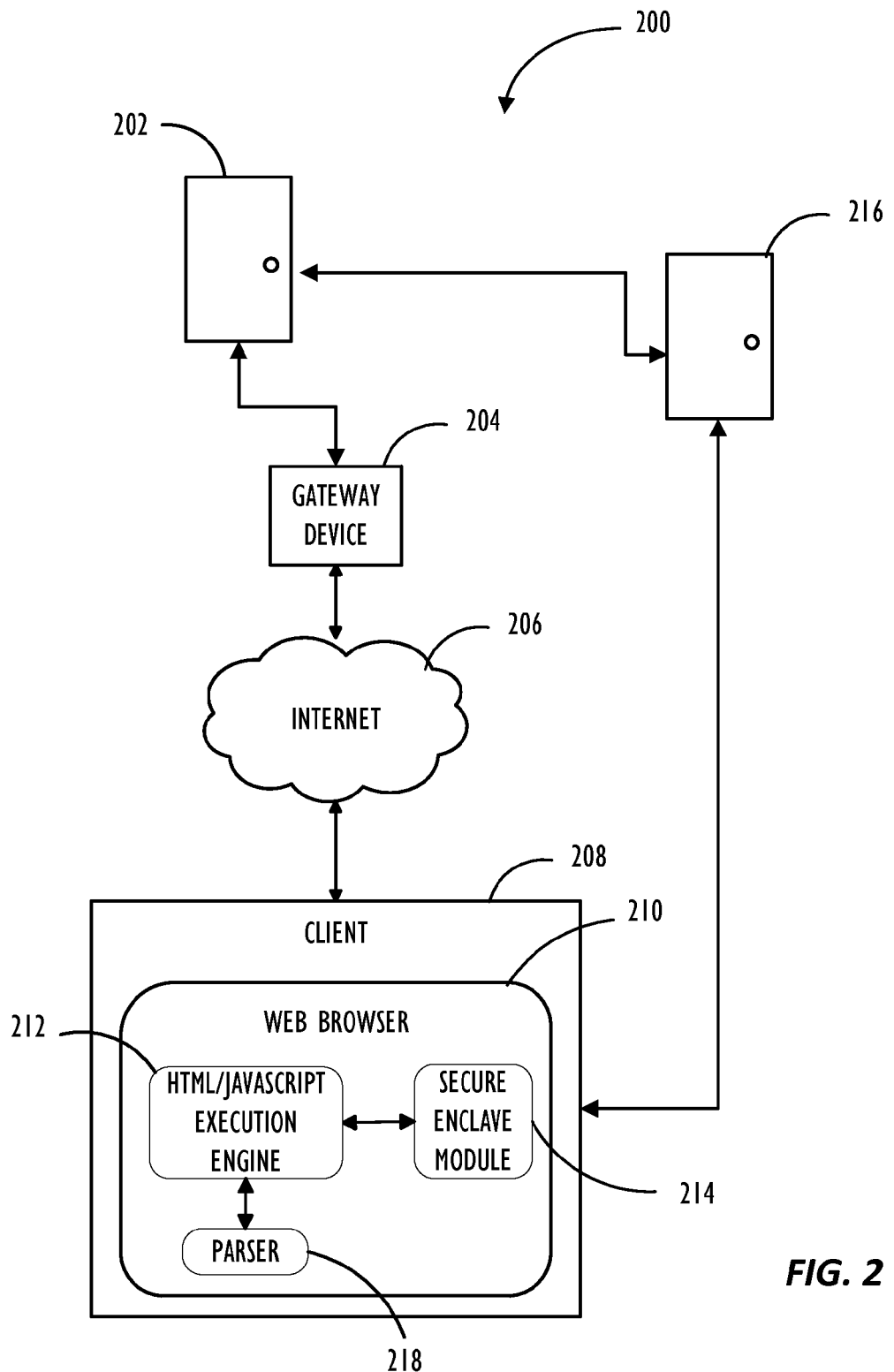
FIG. 2 is a diagram illustrating a system for performing embedded script security according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "computer system" can refer to a single computer or a plurality of computers working together to perform the function described as being performed on or by a computer system.

As used herein, the term "active content" includes content that is delivered as a script for interpreting by a web browser.

As used herein, the term "signing" and "signature" can refer to methods for enabling computing devices to determine whether software code or data or combinations of code and data (collectively "software") have been modified since being verified by a signing authority, including all methods known in the art. Such known methods include generating a hash or "fingerprint" value that essentially condenses the code, data, or code and data into a number that is unique to the particular information contained in the code and/or data. This hash or fingerprint is then encrypted using a private key that can be decrypted by a public key stored in a client machine according to a well-known PKI encryption scheme. The encrypted hash or fingerprint is referred to as a signature and the process of generating the signature is generally referred to as signing. A number of different types of hash algorithms can be used, and therefore, the use of the terms "signing" and "signature" are not intended to limit the scope of the description or the claims to any particular form of cryptographic process, hash function or validation algorithm. Although described herein in terms of a hash function, any technique for generating a digital signature of content may be used.

As used herein, the term "secure enclave module" can refer to a set of CPU instructions that instantiates a protected container. The protected container can provide a secure memory location for an application to execute code and store data inside in the context of an OS process. An application that executes in this environment is called a secure enclave. A secure enclave provides a benefit of a private region of secure code that is immune from attacks by malware that may be embedded as JavaScript in web pages or resident on client computers. A secure enclave can be any execution mode which uses hardware on a client computer to make execution of an application opaque or undetectable to the operating system. Thus, execution of an application is also opaque or undetectable to malware that may be embedded in JavaScript or any client computer. An example of a secure enclave that can be used is an Intel® SGX which is available from the Intel® Corporation.

A technique allows a client computing system with a user client or web browser to receive a web page having active content in response to transmitting a request for content. The active content includes a signature and a certificate. The signature may optionally include a set of attributes associated with the active content from a web domain. These optional attributes may include information to be utilized by a web browser during validation to authenticate origin of the script, authorship of script, and/or a permitted use of the active content. In embodiments, active content may be signed at a web server or at a gateway in communication with the web server. The web browser can include logic to interpret the signature and the set of attributes. The browser can optionally validate the signature in a secure enclave module. The signature is validated for authenticity after which a check of the attributes is performed to determine whether the active content originated at a location other than an authorized origin.

Referring to the figures, FIG. 1 is an example of a client-side script 100 in a JavaScript scripting language as embedded JavaScript instructions in a Hypertext Markup Language (HTML) web page that can be executed by a web browser (hereinafter referred to as active content) according to one embodiment. As shown in FIG. 1, script 100 can be configured to provide embedded script security in web pages that are received from a web server which can be used to determine whether to execute of script. Script security, in a non-limiting example, can include validating signatures and other attributes related to origin, source of script, or the like that may be found in web pages. Scripts may be signed dynamically at a web server or signed at a gateway device, as will be discussed below in embodiments. In an embodiment, a web browser at a client machine can be configured with appropriate web extensions to validate script 100 in a secure enclave having suitable security logic prior to execution of script 100. As such, web browser can include logic for interpreting a signature and the set of attributes as formatted in the active content. As shown in FIG. 1, script 100 can include a digital signature, e.g., //signature (an encrypted version of a document hash or digest) and a certificate which can provide a location on where to obtain a public key for validation (e.g., //certificate in script 100). Script 100 can include optional attributes in the digital signature such as, for example, an attribute to authenticate origin and authorship of active content (e.g., //origin in script 100) and an attribute for a permitted use of active content (e.g., //alloweddomains in script 100). The signature and attributes are formatted so that an enhanced browser is capable of interpreting the signature and attributes. The signature and the attributes are formatted to be ignored by a browser incapable of interpreting the signature and the set of attributes, i.e., a non-enhanced browser Script will ignore the signature and consider the signature and the attributes merely as a comment embedded in the code of script 100 without further action. Script 100 may be validated in a client machine using the signature and attributes in order to determine the trustworthiness of script 100. The attributes illustrated in FIG. 1 is illustrative and by way of example only; other attributes may be embedded in a script in a web page that are received from a web server.

FIG. 2 illustrates a system 200 for performing embedded script security of active content, e.g., Script 100 of FIG. 1, according to one embodiment. System 200 may include a web/content server 202, gateway device 204, Internet 206, and client machine 208 (or client 208). Web server 202 is in communication with client 208 over Internet 206 to communicate web pages from web server 202. Web pages that are received from web server 202 can include signed active content including signatures and optionally can include attributes as described above with reference to FIG. 1. In an embodiment, web server 202 can include logic for dynamically signing scripts in web pages instead of being done remotely elsewhere before providing the signed scripts to web server 202. Web server 202 can include a secure enclave module with algorithms related to various security schemes such as, e.g., digital certificates, signing keys, and the like that may be used for signing scripts in web pages. Web server 202 can use signing logic to embed digital signatures and other attributes in active content that are received from web domains and which are delivered to client 208 in response to an HTTP request, e.g., a HTTP GET request. Web content can include dynamic content as embedded scripts within a markup language document, e.g., HTML of a web page. In an embodiment, web server 202, client 208, and gateway device 204 are in communication with certificate server 216 for receiving private keys, public keys, and/or root certificates associated with signing scripts in a web page and validating certificates in the received web pages.

Also illustrated in FIG. 2, gateway device 204 is in communication with client 208 via Internet 206 to facilitate communication between Internet 206 and client 208. In an embodiment, gateway device 204 can optionally sign scripts in web pages that are received from web server 202. Certificate server 216 is also in communication Client 208 for validation of the certificate in script 100 and for receiving validation keys needed for validation script 100. It is to be appreciated that Internet 206 is not limited to a network of interconnected computer networks that use an internet protocol (TCP/IP), and can also include other high-speed data networks and/or telecommunications networks that are configured to pass information back and forth to client 208 via gateway device 204. Also, while two servers 202 and 216 are shown in the example of system 200, any number of servers are contemplated to be in communication with client 208.

Client 208 can include a desktop computer, laptop computer, smart phone, tablet device, and any other types of computing devices having a processor and networking capabilities. Client 208 includes a web browser 210 that is configured to display the contents of a web page received from web server 202. Web browser 210 can include a HTML/JavaScript execution engine 212 or other similar web browser engine for interpreting and executing client-side scripts in web pages that may be created through JavaScript or other scripting applications. A parser 218 communicates with engine 212 and is configured to locate the active content in the received web page.

In an embodiment, HTML/JavaScript execution engine 212 is optionally connected to a secure enclave module 214. Client 208 can include instructions for creating and maintaining a secure enclave in which scripts, applications, or program code may be validated within web browser 210. In an embodiment, secure enclave module 214 can include same or similar logic as the signing location, e.g., web server 202 or gateway device 204, in order to verify or authenticate digital signatures and other attributes in web pages received from web server 202, for example, through various security schemes, such as digital certificates, signing keys, and the like. In an embodiment, secure enclave module 214 may include validation logic for validating at least one of a script signature, checksum, identity, origin, or the like in script 100 (FIG. 1) in order to determine the trustworthiness of script 100. Secure enclave technology through a secure enclave module 214 is optional for providing better protection against malware that may be present on client 208.

Figure 3:
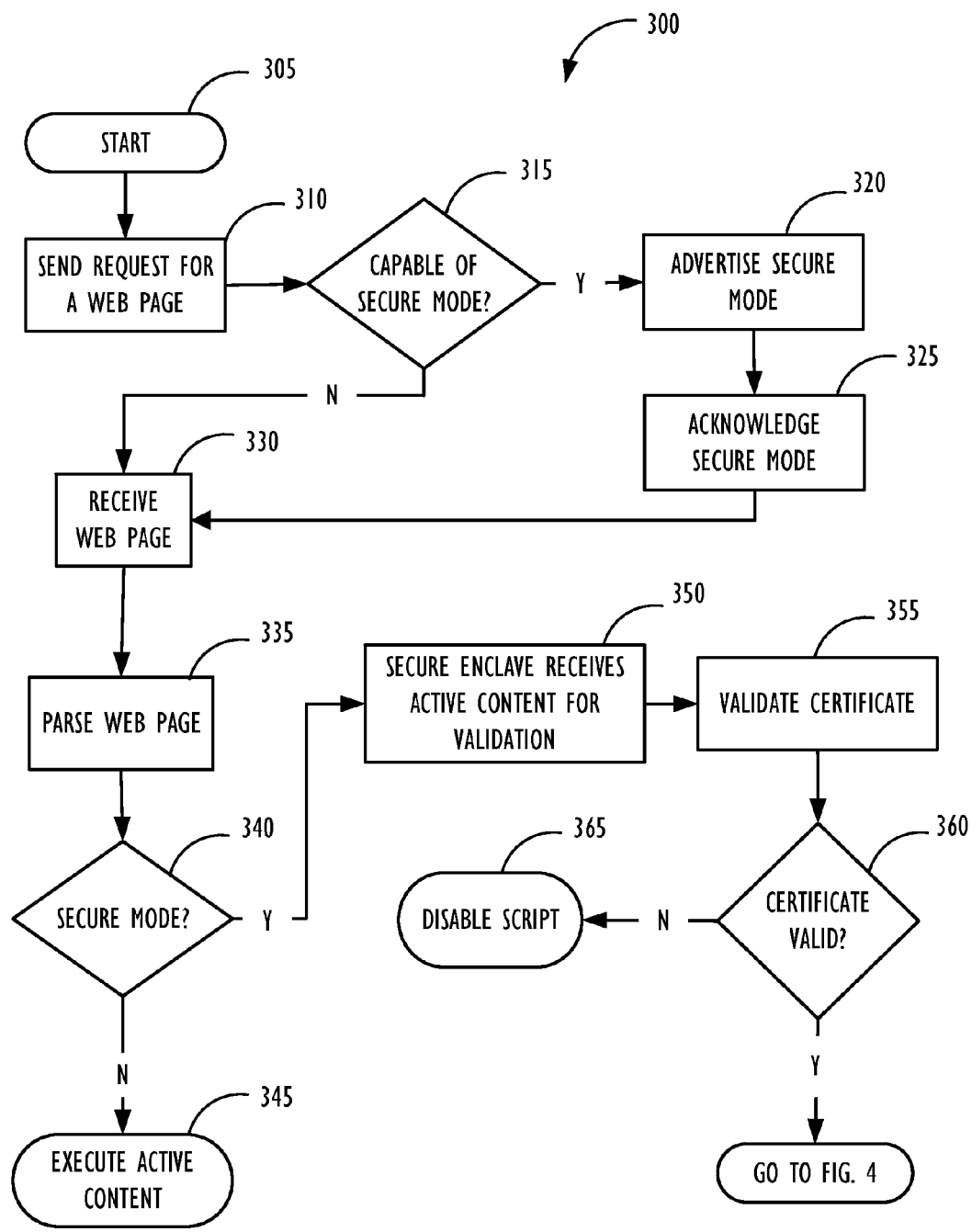
FIG. 3 is a flowchart illustrating a technique for validating active content in a web browser according to one embodiment.
Figure 4:
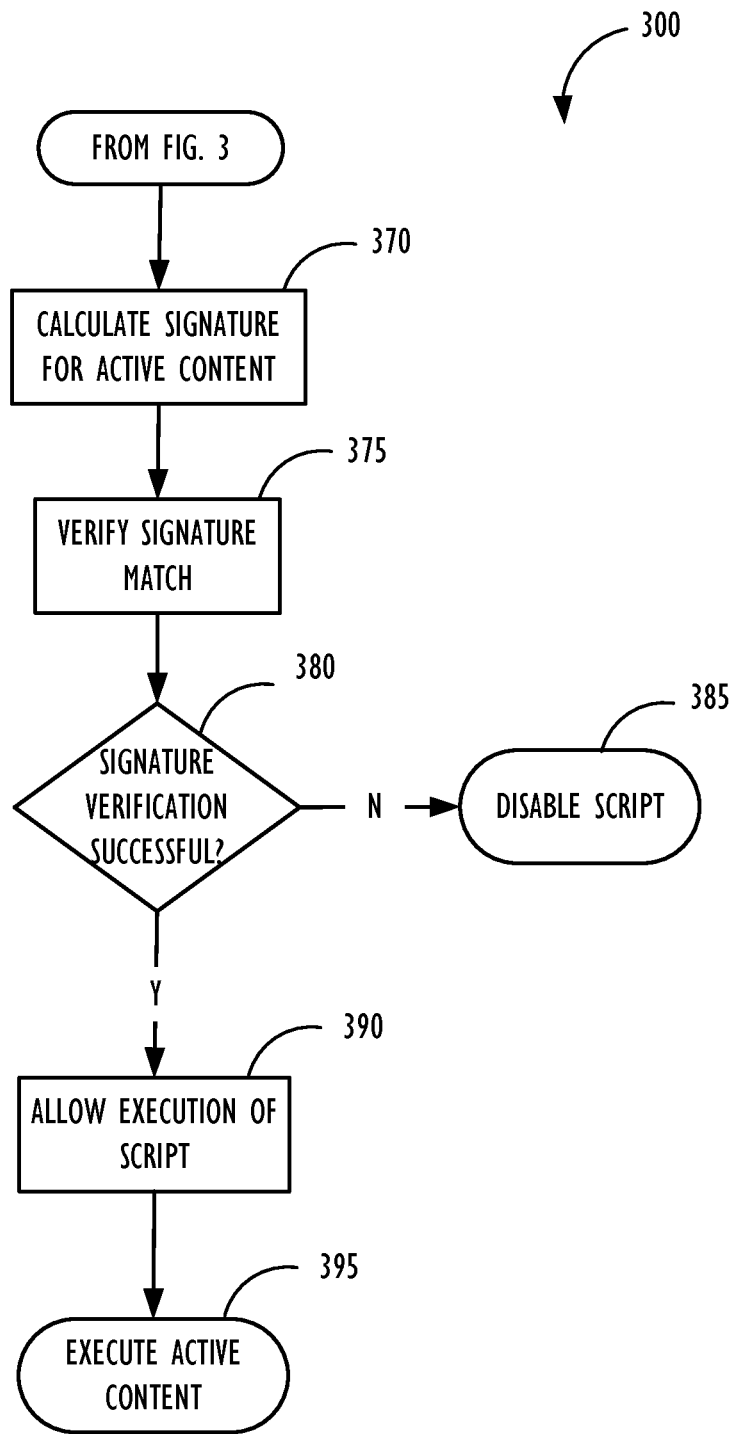
FIG. 4 is a flowchart illustrating a technique for validating active content in a web browser according to one embodiment.

FIG. 3 is a flowchart illustrating an embodiment of a validating process 300 that may be used for validating active content received from a web server 202 (FIG. 2). As process 300 is performed by system 200, FIG. 2 is also referenced in the description of process 300.

Process 300 begins in step 305. In 310, a web browser may request a web page from a web domain through a HTTP GET request. The web browser may be an enhanced web browser (capable of interpreting signatures and attributes embedded in active content) or a non-enhanced web browser (which cannot interpret signatures and attributes which is ignored as comments). In 315, if web browser is not capable of secure mode communication (i.e., step 315="N") and cannot interpret a signature and attributes in a web page (i.e., a non-enhanced web browser), step 315 proceeds to step 330 where web browser 210 will receives a web page from web server 202 via gateway device 204.

However, in 315, if web browser is an enhanced browser such as, for example, web browser 210 and can interpret and validate scripts, signatures, or the like in active content (i.e., step 315="Y"), then, in 320, web browser 210 advertises that it is a secure browser to web server 202. For example, web browser 210 may advertise its ability to execute in secure mode through its HTTP header field in the HTTP GET request. In 325, web server 202 will acknowledge secure mode communication and starts the process to authenticate itself to web browser 210 that it is a trusted party. For example, if web server 202 wants the session to be protected, web server 202 will reply with a request that web browser 210 enter secure mode. Step 325 proceeds to step 330.

In 330, web browser 210 will receives a web page from web server 202 via gateway device 204 in response to the HTTP GET request. The web page can contain dynamic or active content, e.g., within each active content block (i.e., code within JavaScript tags) there may be embedded scripts in JavaScript, a digital signature, attributes, domain certificate, along with the rest of the active content, as described above with reference to FIG. 1. For example, with reference to script 100, active content can include a predetermined marker such as "secure=true" which can indicate signature and/or attributes in one or more active content blocks in the web page. In embodiments, the active content block can include signatures that may be dynamically signed at web server 202 or at gateway device 204 between web server 202 and the Internet 206 instead of being done before providing the script to web server 202 or gateway device 204 for transmission to client 208. In order to create signed active content, for example, active content of script 100 is hashed using a suitable hash function, e.g., a cryptographic SHA-1 hash function, to create an original message digest. Optionally, attributes of the active content (e.g., attributes related to origin, allowed domains, permitted use of the active content, or the like) may be included in the active content prior to hashing and creating a message digest. The message digest is then encrypted using a private key of the author to create a digital signature. The digital signature is embedded into the active content along with a certificate for the web domain and sent to web browser 210.

In 335, web browser 210 parses the web page to locate the active content and/or convert it into a document object that can be manipulated by JavaScript. In 340, if web browser 210 and web server 202 are not in secure mode communication (i.e., step 340="N"), in 345, web browser 210 will execute the active content that is received in web page. However, if web browser 210 and web server 202 are communicating in secure mode (i.e., step 340="Y"), in 350, secure enclave module 214 receives the active content in the web page for validation.

In 355, secure enclave module 214 validates the certificate in the active content. Secure enclave module 214 includes validating logic to extract information related to validating the certificate in the active content. For example, secure enclave module 214 checks each active content block for a predetermined marker, for example, "secure=true", to determine whether active content is present. Secure enclave module 214 can communicate with certificate server 216 to receive a certificate for a web domain associated with the active content. The received certificate from certificate server 216 is compared with the certificate in the active content.

In 360, secure enclave module 214 determines whether the certificates match from step 355. If the certificates do not match thus indicating an invalid certificate (i.e., step 360="N"), in 365, secure enclave module 214 can disable script 100 (i.e., can refuse to execute the active content) and notify client 208 via web browser 210 of problems in authenticating the active content. If the certificates match thus indicating a valid certificate (i.e., step 360="Y"), in 370, secure enclave module 214 calculates a signature of the active content for validating the active content.

In 370, in order to calculate a signature, secure enclave module 214 communicates with certificate server 216 to obtain a public key for validating the active web content. Secure enclave module 214 uses the public key to decrypt the signature and obtain the original message digest of the active content. Additionally, secure enclave module 214 creates a message digest of the active content or at least a portion of the active content. Secure enclave module 214 extracts appropriate information from active content including attributes but excluding the signature and certificate, which is then rehashed to create a new message digest. It is to be appreciated that validation can be performed while leaving the active content in cleartext.

In 375, the signatures are compared. For example, the original message digest is compared with the new message digest to verify that the signatures match. Additionally, secure enclave module 214 can evaluate the attributes to determine authorized use for the web domain. That is, the attributes are evaluated to ensure that the active content is authorized for use in the domain from which it was obtained, authorized for use in predetermined or defined domains identified in the script 100, or the like.

In 380, if the original message digest in the received web page does not match the new message digest indicating unsuccessful signature verification (i.e., step 380="N"), in 385, secure enclave module 214 can refuse to execute the active content in the web page by disabling the script and notifying client 208 via web browser 210 of problems in the active content. However, in 380, if the original message digest matches the new message digest indicating successful signature verification (i.e., step 380="Y"), in 390, secure enclave module 214 can notify web browser 210 that signature verification was successful and allow execution of script 100. In 395, web browser 210 in response to successful verification of the signature can execute the active content in the web page and render the web page in the web browser 210. Benefits of the embodiments described above include dynamically signing active content at a web server or at a gateway device. Active content can include information needed to validate a digital signature, information of the author and/or origin of active content, information on a permitted use of the active content, or the like.

Figure 5:
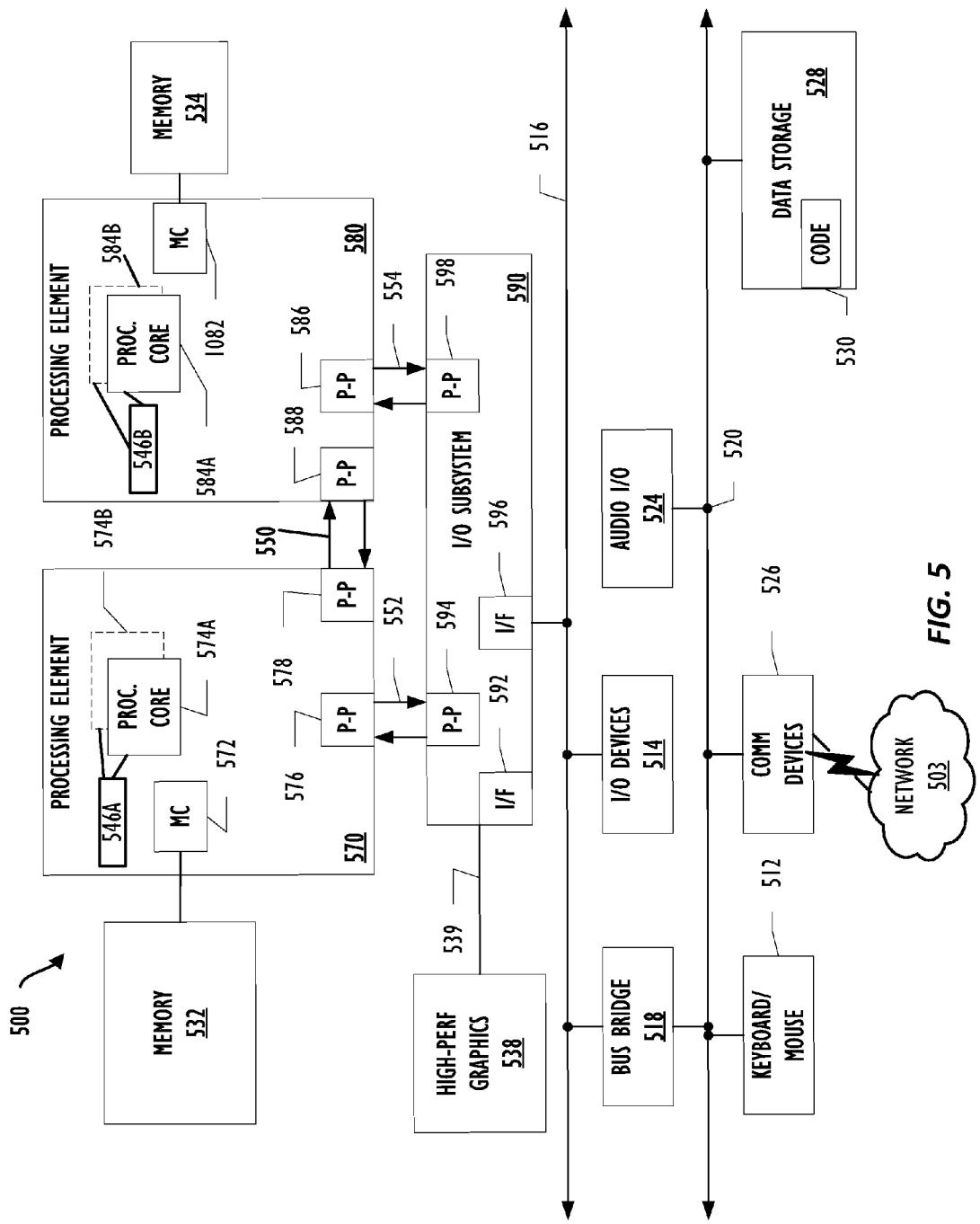
FIG. 5 is a diagram illustrating a computing device for use with techniques described herein according to one embodiment.

Referring now to FIG. 5, a block diagram illustrates a programmable device 500 that may be used within web server 202, gateway device 204, or client 208 in accordance with one embodiment. The programmable device 500 illustrated in FIG. 5 is a multiprocessor programmable device that includes a first processing element 570 and a second processing element 580. While two processing elements 570 and 580 are shown, an embodiment of programmable device 500 may also include only one such processing element.

Programmable device 500 is illustrated as a point-to-point interconnect system, in which the first processing element 570 and second processing element 580 are coupled via a point-to-point interconnect 550. Any or all of the interconnects illustrated in FIG. 5 may be implemented as a multi-drop bus rather than point-to-point interconnects.

As illustrated in FIG. 5, each of processing elements 570 and 580 may be multicore processors, including first and second processor cores (i.e., processor cores 574a and 574b and processor cores 584a and 584b). Such cores 574a, 574b, 584a, 584b may be configured to execute instruction code in a manner similar to that discussed above in connection with FIGS. 1-4. However, other embodiments may use processing elements that are single core processors as desired. In embodiments with multiple processing elements 570, 580, each processing element may be implemented with different numbers of cores as desired.

Each processing element 570, 580 may include at least one shared cache 546. The shared cache 546a, 546b may store data (e.g., instructions) that are utilized by one or more components of the processing element, such as the cores 574a, 574b and 584a, 584b, respectively. For example, the shared cache may locally cache data stored in a memory 532, 534 for faster access by components of the processing elements 570, 580. In one or more embodiments, the shared cache 546a, 546b may include one or more mid-level caches, such as level 2 (L2), level 3 (L3), level 4 (L4), or other levels of cache, a last level cache (LLC), or combinations thereof.

While FIG. 5 illustrates a programmable device with two processing elements 570, 580 for clarity of the drawing, the scope of the present invention is not so limited and any number of processing elements may be present. Alternatively, one or more of processing elements 570, 580 may be an element other than a processor, such as an graphics processing unit (GPU), a digital signal processing (DSP) unit, a field programmable gate array, or any other programmable processing element. Processing element 580 may be heterogeneous or asymmetric to processing element 570. There may be a variety of differences between processing elements 570, 580 in terms of a spectrum of metrics of merit including architectural, microarchitectural, thermal, power consumption characteristics, and the like. These differences may effectively manifest themselves as asymmetry and heterogeneity amongst processing elements 570, 580. In some embodiments, the various processing elements 570, 580 may reside in the same die package.

First processing element 570 may further include memory controller logic (MC) 572 and point-to-point (P-P) interconnects 576 and 578. Similarly, second processing element 580 may include a MC 582 and P-P interconnects 586 and 588. As illustrated in FIG. 5, MCs 572 and 582 couple processing elements 570, 580 to respective memories, namely a memory 532 and a memory 534, which may be portions of main memory locally attached to the respective processors. While MC logic 572 and 582 is illustrated as integrated into processing elements 570, 580, in some embodiments the memory controller logic may be discrete logic outside processing elements 570, 580 rather than integrated therein.

Processing element 570 and processing element 580 may be coupled to an I/O subsystem 590 via respective P-P interconnects 576 and 586 through links 552 and 554. As illustrated in FIG. 5, I/O subsystem 590 includes P-P interconnects 594 and 598. Furthermore, I/O subsystem 590 includes an interface 592 to couple I/O subsystem 590 with a high performance graphics engine 538. In one embodiment, a bus (not shown) may be used to couple graphics engine 538 to I/O subsystem 590. Alternately, a point-to-point interconnect 539 may couple these components.

In turn, I/O subsystem 590 may be coupled to a first link 516 via an interface 596. In one embodiment, first link 516 may be a Peripheral Component Interconnect (PCI) bus, or a bus such as a PCI Express bus or another I/O interconnect bus, although the scope of the present invention is not so limited.

As illustrated in FIG. 5, various I/O devices 514, 524 may be coupled to first link 516, along with a bridge 518 which may couple first link 516 to a second link 520. In one embodiment, second link 520 may be a low pin count (LPC) bus. Various devices may be coupled to second link 520 including, for example, a keyboard/mouse 512, communication device(s) 526 (which may in turn be in communication with the computer network 503), and a data storage unit 528 such as a disk drive or other mass storage device which may include code 530, in one embodiment. The code 530 may include instructions for performing embodiments of one or more of the techniques described above. Further, an audio I/O 524 may be coupled to second bus 520.

Note that other embodiments are contemplated. For example, instead of the point-to-point architecture of FIG. 5, a system may implement a multi-drop bus or another such communication topology. Although links 516 and 520 are illustrated as busses in FIG. 4, any desired type of link may be used. Also, the elements of FIG. 5 may alternatively be partitioned using more or fewer integrated chips than illustrated in FIG. 5.

Figure 6:
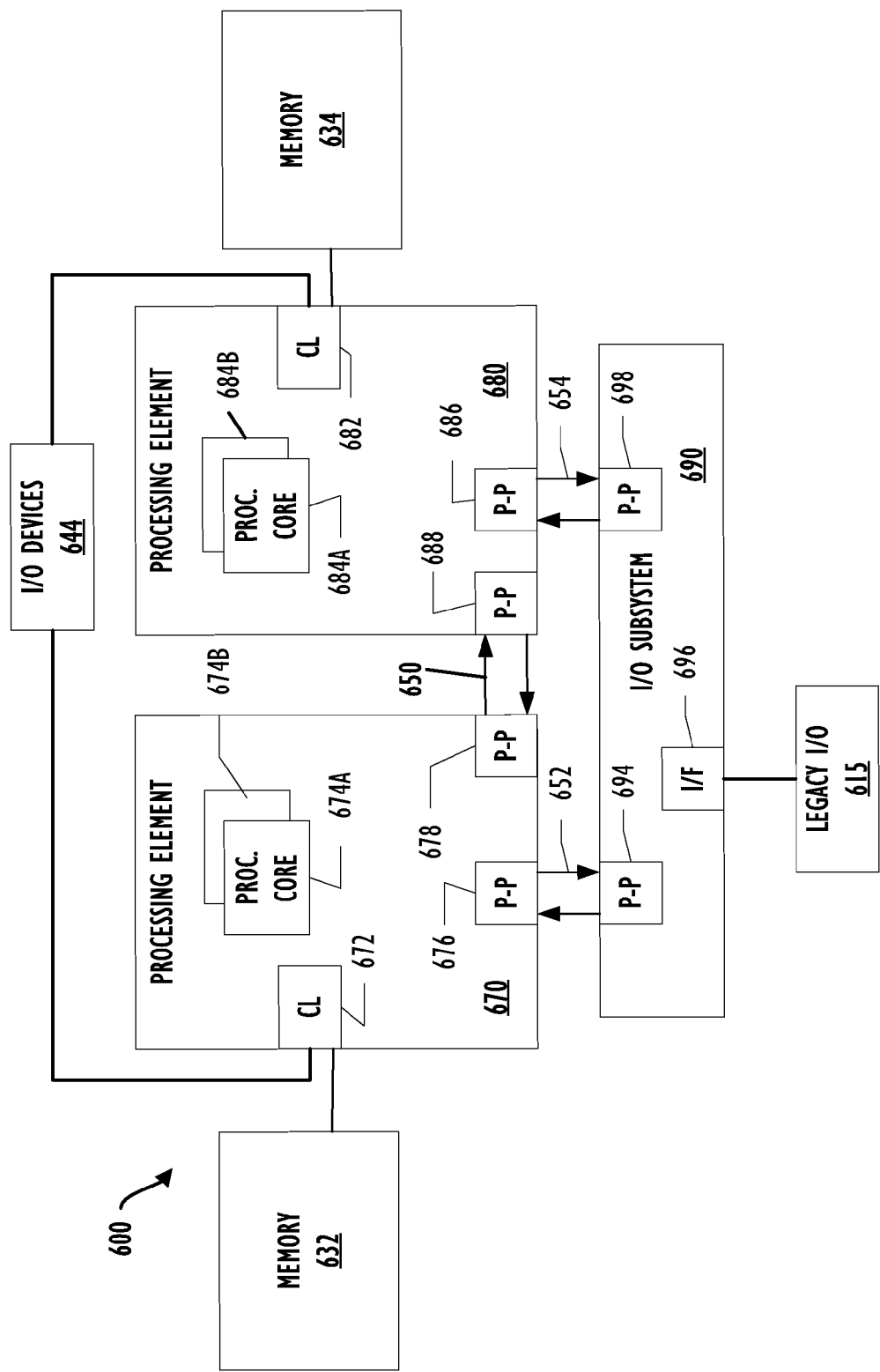
FIG. 6 is a block diagram illustrating a computing device for use with techniques described herein according to another embodiment.

Referring now to FIG. 6, a block diagram illustrates a programmable device 600 according to another embodiment. Certain aspects of FIG. 5 have been omitted from FIG. 6 in order to avoid obscuring other aspects of FIG. 6.

FIG. 6 illustrates that processing elements 670, 680 may include integrated memory and I/O control logic ("CL") 672 and 682, respectively. In some embodiments, the 672, 682 may include memory control logic (MC) such as that described above in connection with FIG. 5. In addition, CL 672, 682 may also include I/O control logic. FIG. 6 illustrates that not only may the memories 632, 634 be coupled to the 672, 682, but also that I/O devices 644 may also be coupled to the control logic 672, 682. Legacy I/O devices 615 may be coupled to the I/O subsystem 690 by interface 696. Each processing element 670, 680 may include multiple processor cores, illustrated in FIG. 5 as processor cores 674A, 674B, 684A, and 684B. As illustrated in FIG. 6, I/O subsystem 690 includes P-P interconnects 694 and 698 that connect to P-P interconnects 676 and 686 of the processing elements 670 and 680 with links 652 and 654. Processing elements 670 and 680 may also be interconnected by link 650 and interconnects 678 and 688, respectively.

The programmable devices depicted in FIGS. 5 and 6 are schematic illustrations of embodiments of programmable devices which may be utilized to implement various embodiments discussed herein. Various components of the programmable devices depicted in FIGS. 5 and 6 may be combined in a system-on-a-chip (SoC) architecture.

Figure 7:
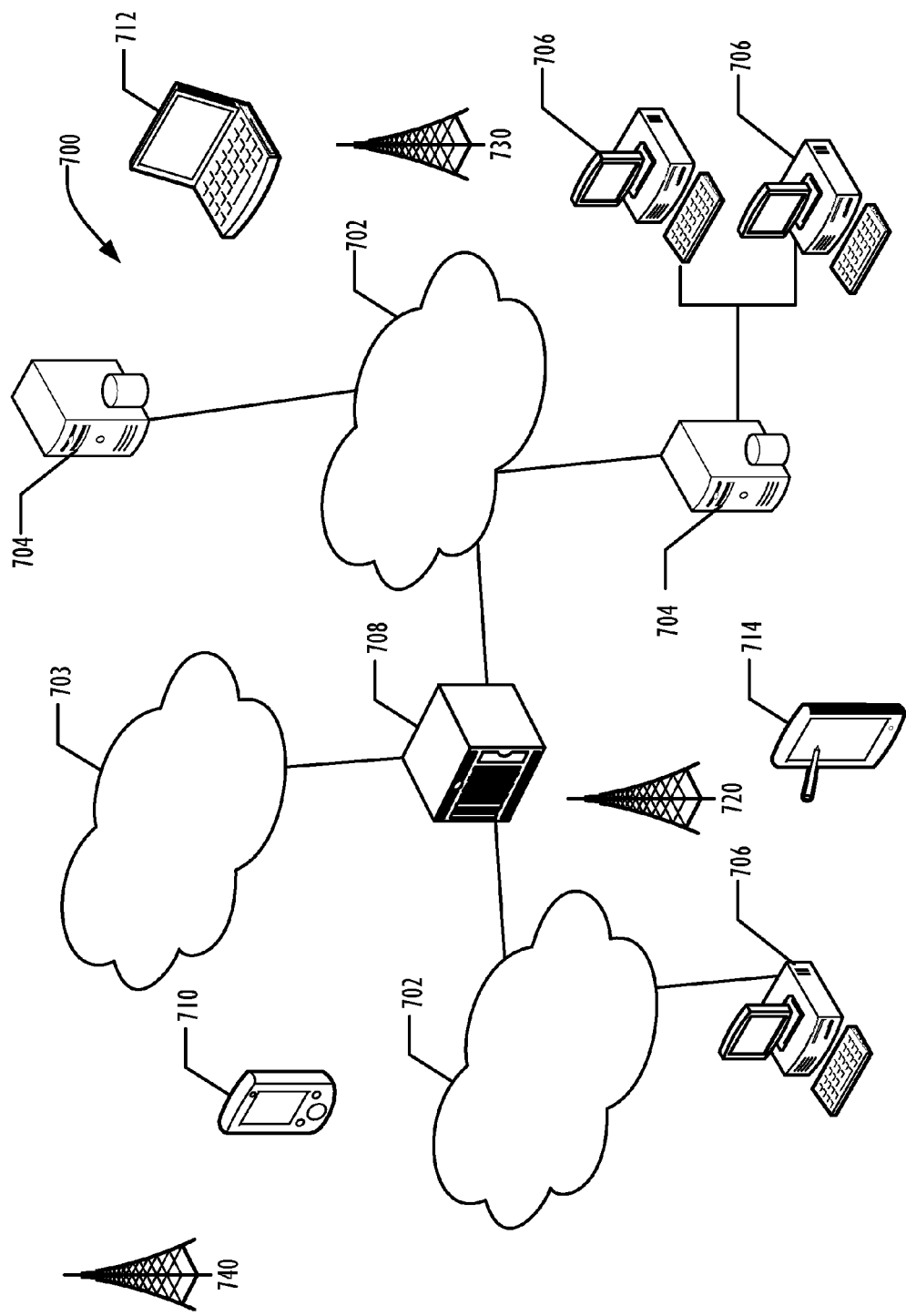
FIG. 7 is a diagram illustrating a network of programmable devices according to one embodiment.

Referring now to FIG. 7, an example infrastructure 700 in which the techniques described above may be implemented is illustrated schematically. Infrastructure 700 contains computer networks 702. Computer networks 702 may include many different types of computer networks available today, such as the Internet, a corporate network, or a Local Area Network (LAN). Each of these networks can contain wired or wireless programmable devices and operate using any number of network protocols (e.g., TCP/IP). Networks 702 may be connected to gateways and routers (represented by 708), end user computers 706, and computer servers 704. Infrastructure 700 also includes cellular network 703 for use with mobile communication devices. Mobile cellular networks support mobile phones and many other types of mobile devices. Mobile devices in the infrastructure 700 are illustrated as mobile phones 710, laptops 712, and tablets 714. A mobile device such as mobile phone 710 may interact with one or more mobile provider networks as the mobile device moves, typically interacting with a plurality of mobile network towers 720, 730, and 740 for connecting to the cellular network 703. Although referred to as a cellular network in FIG. 7, a mobile device may interact with towers of more than one provider network, as well as with multiple non-cellular devices such as wireless access points and routers 708. In addition, the mobile devices 710, 712, and 714 may interact with non-mobile devices such as computers 704 and 706 for desired services, which may include providing the application, script, or web content in web pages to a secure enclave module described above. The functionality of the gateway device 204 or client 208 may be implemented in any device or combination of devices illustrated in FIG. 7; however, most commonly is implemented in a firewall or intrusion protection system in a gateway or router.

The following examples pertain to further embodiments.

Example 1 is a machine readable medium, on which are stored instructions, comprising instructions that when executed by a processor cause a machine to: receive by a browser a web page with active content; and validate the active content; wherein the active content includes a signature of at least a portion of the active content.

In Example 2, the subject matter of Example 1 can optionally include wherein the active content further includes a set of attributes.

In Example 3, the subject matter of Example 2 can optionally include wherein the signature and the set of attributes are formatted to be ignored by a browser incapable of interpreting the signature and the set of attributes.

In Example 4, the subject matter of Example 2 or 3 can optionally include, wherein the instructions to validate the active content comprise instructions that when executed cause the browser to check the set of attributes following a positive determination that the signature is valid; wherein the check of the set of attributes includes information related to checking at least one of origin of the active content, author of the active content, and a permitted use of the active content.

In Example 5, the subject matter of Example 4 can optionally include wherein the instructions to validate the active content comprise instructions that when executed cause the browser to refuse to execute the active content if the check of the set of attributes indicates that the active content originated at a location other than an authorized origin.

In Example 6, the subject matter of Example 1 to 5 can optionally include, wherein the instructions to receive the active content comprise instructions that when executed cause the browser to receive authentication information related to authenticating a web server.

In Example 7 the subject matter of Example 1 to 6 can optionally include, wherein the instructions to validate the active content comprise instructions that when executed cause the browser to validate the signature in a secure enclave module.

In Example 8, the subject matter of Example 1 to 7 can optionally include, wherein the instructions to validate the active content comprise instructions that when executed cause the browser to receive instructions related to obtaining a validation certificate from a certificate server.

Example 9 is a computer system for script security, comprising: one or more processors; and a memory coupled to the one or more processors, on which are stored instructions, comprising instructions that when executed cause one or more of the processors to: receive a web page with active content at a browser; locate the active content with a parser; and validate the active content at the browser; wherein the active content includes a signature of at least a portion of the active content.

In Example 10, the subject matter of Example 9 can optionally include, wherein the active content further includes a set of attributes.

In Example 11, the subject matter of Example 10 can optionally include, wherein the signature and the attributes are formatted to be ignored by a browser incapable of interpreting the signature and the set of attributes.

In Example 12, the subject matter of Example 9 or 19 can optionally include, wherein the instructions further comprise instructions that when executed cause one or more of the processors to: check via the browser the set of attributes following a positive determination that the signature is valid; wherein the check of the set of attributes includes information related to checking at least one of origin of the active content, author of the active content, and a permitted use of the active content.

In Example 13, the subject matter of Example 9 to 12 can optionally include, wherein the instructions further comprise instructions that when executed cause one or more of the processors to receive via the browser authentication information related to authenticating a web server.

In Example 14, the subject matter of Example 9 to 13 can optionally include, wherein the instructions further comprise instructions that when executed cause one or more of the processors to validate via the browser the signature in a secure enclave module.

In Example 15, the subject matter of Example 9 to 14 can optionally include, wherein the instructions further comprise instructions that when executed cause one or more of the processors to receive via the browser instructions related to obtaining a validation certificate from a certificate server.

In Example 16, the subject matter of Example 9 to 15 can optionally include, wherein the instructions further comprise instructions that when executed cause one or more of the processors to refuse to execute the active content if the check of the set of attributes indicates that the active content originated at a location other than an authorized origin.

Example 17 is a computer system for script security, comprising: one or more processors; and a memory coupled to the one or more processors, on which are stored instructions, comprising instructions that when executed cause one or more of the processors to: receive a request for a web page; dynamically sign active content in the web page responsive to receiving the request; and transmit the web page with the active content; wherein the active content includes a signature of at least a portion of the active content.

In Example 18, the subject matter of Example 17 can optionally include, wherein the computer system is a gateway device.

In Example 19, the subject matter of Example 17 or 18 can optionally include, wherein the instructions further comprise instructions that when executed cause the one or more processors to transmit the signature with a set of attributes.

In Example 20, the subject matter of Example 17 to 19 can optionally include, wherein the instruction further comprise instructions that when executed cause the one or more processors to dynamically add the set of attributes to the signature.

Example 21 is a method for script security, comprising: receiving at a browser a web page with active content; locating by the browser the active content; and validating by the browser the active content in the web page; wherein the active content includes a signature of at least a portion of the active content and includes a set of attributes.

In Example 22, the subject matter of Example 21 can optionally include validating the active content in a secure enclave module.

In Example 23, the subject matter of Example 21 or 22 can optionally include checking the set of attributes following a positive determination that the signature is valid; wherein the check of the set of attributes includes information related to checking at least one of origin of the active content, author of the active content, and a permitted use of the active content.

In Example 24, the subject matter of Example 21 to 23 can optionally include refusing to execute the active content if the check of the set of attributes indicates that the active content originated at a location other than an authorized origin.

In Example 25, the subject matter of Example 21 to 24 can optionally include, wherein the signature and the set of attributes are formatted to be ignored by a browser incapable of interpreting the signature and the set of attributes.

In Example 26, the subject matter of Example 1 to 25 can optionally include receiving authentication information related to authenticating a web server.

In Example 27, the subject matter of Example 21 to 26 can optionally include instructions related to obtaining a validation certificate from a certificate server.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. One or more non-transitory machine readable media, on which are stored instructions, comprising instructions that when executed by a processor cause a machine to:
   receive, by a browser on a computing system, a web page with active content; and
   in response to the browser detecting the active content, determine that the computing system comprises a secure memory location;
   in response to determining that the computing system comprises a secure memory location, validate, utilizing the secure memory location of the computing system, the active content for a presence of unauthorized content by validating a signature of at least a portion of the active content while leaving the active content in cleartext, wherein the signature is formatted for execution of the active content regardless of the determination that the computing system comprises the secure memory location; and
   execute the active content in response to determining that the validation of the active content indicates that the active content originated from an authorized origin.

2. The one or more non-transitory machine readable media of claim 1, wherein the active content further includes a set of attributes.

3. The one or more non-transitory machine readable media of claim 2, wherein the signature and the set of attributes are formatted to be ignored by a browser incapable of interpreting the signature and the set of attributes.

4. The one or more non-transitory machine readable media of claim 2, wherein the instructions to validate the active content comprise instructions that when executed cause the browser to check the set of attributes following a positive determination that the signature is valid; and
   wherein the set of attributes includes information for one or more of an origin of the active content, an author of the active content, and a permitted use of the active content.

5. The one or more non-transitory machine readable media of claim 4, wherein the instructions to validate the active content comprise instructions that when executed cause the browser to refuse to execute the active content if the check of the set of attributes indicates that the active content originated at a location other than an authorized origin.

6. The one or more non-transitory machine readable media of claim 1, wherein the instructions to receive the active content comprise instructions that when executed cause the browser to receive authentication information related to authenticating a web server.

7. The one or more non-transitory machine readable media of claim 1, wherein the instructions to validate the active content comprise instructions that when executed cause the browser to receive instructions related to obtaining a validation certificate from a certificate server.

8. A computer system for script security, comprising:
   one or more processors; and
   a memory coupled to the one or more processors, on which are stored instructions, comprising instructions that when executed cause at least some of the one or more processors to:
      receive a web page with active content at a browser;
      locate the active content with a parser;
      in response to the browser locating the active content, determine that the computing system comprises a secure memory location;

in response to determining that the computing system comprises a secure memory location, validate, utilizing the secure memory location of the computing system, the active content for a presence of unauthorized content by validating a signature of at least a portion of the active content while leaving the active content in cleartext, wherein the signature is formatted for execution of the active content regardless of the determination that the computing system comprises the secure memory location; and execute the active content in response to determining that the validation of the active content indicates that the active content originated from an authorized origin.

9. The computer system of claim 8, wherein the active content further includes a set of attributes and wherein signature and the set of attributes are formatted to be ignored by a browser incapable of interpreting the signature and the set of attributes.

10. The computer system of claim 8, wherein the active content further includes a set of attributes and wherein instructions further comprise instructions that when executed cause at least some of the one or more processors to:

check via the browser the set of attributes following a positive determination that the signature is valid;

wherein the set of attributes includes information for one or more of an origin of the active content, an author of the active content, and a permitted use of the active content.

11. The computer system of claim 8, wherein the instructions further comprise instructions that when executed cause at least some of the one or more processors to receive, via the browser, authentication information related to authenticating a web server.

12. The computer system of claim 8, wherein the instructions further comprise instructions that when executed cause at least some of the one or more processors to receive via the browser instructions related to obtaining a validation certificate from a certificate server.

13. A method for script security, comprising:

receiving at a browser on a computer system, a web page with active content;

locating by the browser the active content;

in response to the browser locating the active content, determining that the computing system comprises a secure memory location;

in response to determining that the computing system comprises a secure memory location, validate, utilizing the secure memory location of the computing system, the active content for a presence of unauthorized content by validating a signature of at least a portion of the active content while leaving the active content in cleartext, wherein the signature is formatted for execution of the active content regardless of the determination that the computing system comprises the secure memory location; and executing the active content in response to determining that the validation of the active content indicates that the active content originated from an authorized origin.

14. The method of claim 13, wherein the active content includes a set of attributes, and wherein the method further comprising checking the set of attributes following a positive determination that the signature is valid;

wherein checking the set of attributes comprises checking information related to at least one of origin of the active content, author of the active content, and a permitted use of the active content.

\* \* \* \* \*